United States Patent [19]
Kioka et al.

[11] Patent Number: 5,055,528
[45] Date of Patent: Oct. 8, 1991

[54] PROCESS FOR PRODUCING PROPYLENE COPOLYMERS

[75] Inventors: Mamoru Kioka; Akinori Toyota; Norio Kashiwa, all of Iwakuni, Japan

[73] Assignee: Mitsui Petrochemical Industries, Ltd., Tokyo, Japan

[21] Appl. No.: 465,648

[22] PCT Filed: Jul. 20, 1987

[86] PCT No.: PCT/JP87/00529
§ 371 Date: Mar. 17, 1988
§ 102(e) Date: Mar. 17, 1988

[87] PCT Pub. No.: WO88/00599
PCT Pub. Date: Jan. 28, 1988

Related U.S. Application Data

[63] Continuation of Ser. No. 188,394, Mar. 17, 1988, abandoned.

[30] Foreign Application Priority Data

Jul. 21, 1986 [JP] Japan .................................. 61-169698

[51] Int. Cl.⁵ ...................... C08F 297/08; C08L 53/00
[52] U.S. Cl. ..................................... 525/270; 525/323; 525/88

[58] Field of Search ................................. 525/270, 323

[56] References Cited

U.S. PATENT DOCUMENTS

| 4,291,138 | 9/1981 | Sato et al. | 525/323 |
| 4,510,292 | 4/1985 | Chiba et al. | 525/323 |
| 4,547,552 | 10/1985 | Toyota et al. | 525/270 |
| 4,739,015 | 4/1988 | Toyota et al. | 525/270 |
| 4,771,103 | 9/1988 | Chiba et al. | 525/323 |

FOREIGN PATENT DOCUMENTS

| 0103987 | 3/1984 | European Pat. Off. | |
| 2132624 | 7/1984 | United Kingdom | 525/323 |

Primary Examiner—Carman J. Seccuro
Attorney, Agent, or Firm—Sherman and Shalloway

[57] ABSTRACT

A process for producing a propylene polymer having good flowability with an MFR of at least 10 g/10 minutes comprises a first polymerization stage consisting of at least two steps and a subsequent second polymerization stage. It is important to control the intrinsic viscosities of a crystalline propylene polymer obtained from the first step of the first polymerization stage and a crystalline propylene polymer obtained from the final step of the first polymerization stage.

9 Claims, No Drawings

PROCESS FOR PRODUCING PROPYLENE COPOLYMERS

This application is a continuation of application Ser. No. 07/188,394 filed Mar. 17, 1988, now abandoned.

TECHNOLOGICAL FIELD

This invention relates to a process for producing a propylene copolymer. More specifically, it relates to a process for producing a propylene copolymer having excellent melt-flowability, moldability, rigidity, impact strength, powder flowability and low-temperature heat-sealability under a low partial pressure of hydrogen with a high catalyst efficiency and good operability.

BACKGROUND TECHNOLOGY

It has been known that in the presence of a stereospecific catalyst of various types, a crystalline polymer or copolymer of propylene (the two will sometimes be generically referred to as polypropylene) is produced in a first step, and in a second and a subsequent step, propylene and another alpha-olefin are copolymerized in the presence of the above polypropylene to produce a crystalline polymer or copolymer of propylene and/or the other alpha-olefin, above all a crystalline polymer or copolymer of ethylene or a crystalline polymer or copolymer containing ethylene as a main component. It is known that such a multiplicity of steps give a composition having improved impact strength at low temperatures while retaining the excellent rigidity of polypropylene.

The composition is usually a uniform and intimate mixture of the polymers or copolymers produced in the individual steps, but is generally referred to as a block copolymer. The block copolymer gains widespread use in containers, automobile parts, easily low-temperature sealable films, high impact films, etc.

Japanese Laid-Open Patent Publication No. 115296/75 and its corresponding U.S. Pat. No. 3,974,236 disclose a process for producing a heteroblock copolymer of propylene and ethylene in two stages described below. The first stage consists of at least one step of producing isotactic polypropylene by polymerizing propylene in the presence of a catalyst and at least one step of producing an ethylene/propylene copolymer by polymerizing a mixture of ethylene and propylene in the presence of a catalyst. The ethylene content of this mixture is 0.2 to 3% by weight, and the content of isotactic polypropylene is at most 25% by weight of the heteroblock copolymer produced in the first stage. The first stage is started by polymerizing propylene and the two steps are successively carried out. In the second stage, another copolymer of ethylene and propylene is produced by polymerizing a mixture of ethylene and propylene in the presence of a catalyst until the quantity of the copolymer reaches 5 to 20% by weight of the heteroblock copolymer to be finally produced. The ethylene content of the mixture is at least 50%. The above patent specifications state that the heteroblock copolymer has excellent surface gloss, high flexural rigidity, and good impact strength.

British Patent No. 1,543,096 discloses a process for producing a chemically blended propylene polymer composition suitable for use in producing molded articles having excellent properties such as high impact strength and rigidity.

This process comprises (i) producing crystalline polypropylene component, (I) in a first step wherein propylene optionally containing up to 1 mole% of another olefin is polymerized in the presence of a catalyst composed of (A) a carrier-supported titanium catalyst component containing at least magnesium, halogen and titanium on the surface of the carrier and (B) an organoaluminum compound, (ii) producing in a second step wherein propylene and ethylene are copolymerized in the presence of the reaction product of the first step and the same catalyst while maintaining the content of propylene in the gaseous phase of the polymerization zone at 65 to 90 mole%; and (iii) producing polyethylene or an ethylene/propylene copolymer component (III) in a third step wherein ethylene or both ethylene and propylene are polymerized in the presence of the reaction product of the second step and the same catalyst while maintaining the content of propylene in the gaseous phase of the polymerization zone at 0 to 15 mole%.

British Patent No. 1,566,391 discloses a process for producing a chemically blended propylene polymer composition having impact resistance and being suitable for production of molded articles having excellent properties such as high impact strength and rigidity and improved whitening resistance and gloss.

U.S. Pat. No. 4,547,552 discloses a process for producing a propylene block copolymer composition suitable for producing molded articles having excellent impact strength, especially at low temperatures, and excellent rigidity in a well balanced combination. This process comprises (I) a first stage of polymerizing propylene containing 0 to 5 mole% of another olefin in the presence of a catalyst composed of (A) a solid titanium catalyst component consisting essentially of titanium, magnesium, halogen, and an electron donor, (B) an organoaluminum compound, and (C) an organic silicon compound having an Si-O-C bond or an Si-N-C bond to thereby form a crystalline propylene polymer or copolymer; and (II) a second stage of polymerizing propylene and ethylene, or propylene, ethylene and another olefin in the presence of the reaction product of the first stage and the same catalyst as used in the first stage to form a rubbery propylene copolymer and a crystalline ethylene polymer or copolymer.

DISCLOSURE OF THE INVENTION

It is an object of this invention to provide a process for producing a propylene copolymer.

Another object of this invention is to provide a process for producing a propylene copolymer having excellent melt-flowability and moldability under a low partial pressure of hydrogen with a high catalytic efficiency.

Still another object of this invention is to provide a process for producing a propylene copolymer having excellent rigidity, impact strength and powder flowability with a high catalytic efficiency.

Other objects of this invention along with its advantages will become apparent from the following description.

According to this invention, these objects and advantages of the invention are achieved by a process for producing a propylene block copolymer having an MFR value of at least 10 g/10 minutes in the presence of a catalyst system formed from
(A) a solid titanium catalyst component containing magnesium, titanium, halogen and a polycarboxylic acid ester as essential ingredients formed by contacting a magnesium compound, a titanium compound and the polycarboxylic acid ester, (B) an organoaluminum compound, and (C) an organic silicon compound represented by the following formula (I)

$$SiR^{11}{}_m(OR^{12})_{4-m} \qquad (I)$$

wherein $R^{11}$ represents an alkyl or alkenyl group, $R^{12}$ represents a hydrocarbon group, and m is $1 \leq m \leq 2$, which comprises (I) polymerizing or copolymerizing propylene in a first polymerization stage consisting of at least two steps wherein a crystalline propylene polymer having an intrinsic viscosity $[\eta]_{FC}$, measured in decalin at 135° C., of less than 1.8 dl/g is produced in the first step, the polymerization or copolymerization is carried out further in the subsequent steps, and from the final step, a crystalline propylene polymer having an intrinsic viscosity $[\eta]_{XC}$, measured in decalin at 135° C., of 0.7 to 2.0 dl/g is taken out, the $[\eta]_{FC}/[\eta]_{XC}$ ratio being adjusted to not more than 0.9, and (II) random-copolymerizing propylene and another alpha-olefin in a mole ratio of from 10/90 to 90/10 in a second polymerization stage in the presence of said crystalline propylene polymer.

The catalyst component (A) used in this invention is a highly active catalyst component containing magnesium, titanium, halogen and the polycarboxylic acid ester as essential ingredients. The titanium catalyst component (A) contains a magnesium halide having a smaller crystallite size than commercially available magnesium halides and usually has a specific surface area of at least about 50 m²/g, preferably about 60 to about 1000 m²/g, more preferably about 100 to about 800 m²/g, and its composition does not substantially change when washed with hexane at room temperature. When a diluent, for example an inorganic or organic compound such as a silicon compound, an aluminum compound or a polyolefin, is used, the titanium catalyst component (A) exhibits higher performance even when its specific surface is lower than that mentioned above. Preferably, in the titanium catalyst component (A), the halogen/titanium atomic ratio is from about 5 to about 100, especially from about 5 to about 100; the mole ratio of the electron donor/titanium is from about 0.1 to about 10, especially from about 0.2 to about 6; and the magnesium/titanium atomic ratio is from about 1 to about 100, especially from about 2 to about 50. The component (A) may contain another electron donor, metals, elements, functional groups, etc.

The titanium catalyst component (A) can be prepared, for example, by contacting a magnesium compound (or metallic magnesium), an electron donor and a titanium compound with each other, optionally in the presence of another reaction agent such as a compound of silicon, phosphorus or aluminum.

Examples of the method of producing the titanium catalyst component (A) are disclosed, for example, in the specifications of Japanese Laid-Open Patent Publications Nos. 108385/1975, 126590/1975, 20297/1976, 28189/1976, 64586/1976, 92885/1976, 136625/1976, 87489/1977, 100596/1977, 100596/1977, 147688/1977, 104593/1977, 2580/1977, 40093/1978, 43094/1978, 135102/1980, 135103/1981, 811/1981, 11908/1981, 18606/1981, 83006/1983, 138705/1983, 138706/1983, 138707/1983, 138708/1983, 138709/1983, 138710/1983, 138715/1983, 23404/1985, 21109/1986, 37802/1986, 37803/1986 and 152710/1980.

Some preferred methods for producing the titanium catalyst component (A) among them are described below.

(1) A magnesium compound or a complex of a magnesium compound is reacted with a titanium compound which forms a liquid phase under the reaction conditions. Prior to the reaction, the magnesium compound or the magnesium complex may, or may not, be pulverized in the presence or absence of an electron donor, a pulverization aid, etc., and may or may not be pre-treated with an electron donor and/or an organoaluminum compound, or a reaction aid such as a halogen-containing silicon compound. In the above method, the electron donor is used at least once.

(2) A liquid form of a magnesium compound having no reducing ability is reacted with a liquid titanium compound in the presence of an electron donor to precipitate a solid titanium complex.

(3) The product of (2) is reacted with a titanium compound.

(4) The product of (1) or (2) is reacted with an electron donor and a titanium compound.

(5) A magnesium compound or a complex of a magnesium compound and an electron donor is pulverized in the presence of a titanium compound with or without an electron donor, a pulverization aid, etc., and the resulting solid is treated with halogen, a halogen compound or an aromatic hydrocarbon. In the above process, the pulverized product may be pre-treated as required with an electron donor and/or an organoaluminum compound or a reaction aid such as a halogen-containing silicon compound. The electron donor is used at least once in the above process.

(6) The product of (1), (2), (3) or (4) is treated with halogen, a halogen compound or an aromatic hydrocarbon.

(7) A reaction product obtained by contacting a metal oxide, dihydrocarbyl magnesium and a halogen-containing alcohol is contacted with a polycarboxylic acid ester and a titanium compound.

(8) A magnesium salt of an organic acid, a magnesium compound such as an alkoxymagnesium or aryloxymagnesium are reacted with a polycarboxylic acid ester, a titanium compound, and/or a halogen-containing hydrocarbon.

Especially preferred are those in which a liquid titanium halide is used, or a halogenated hydrocarbon is used during or after using a titanium compound.

The polycarboxylic acid ester is an electron donor which can be an ingredient constituting the highly active titanium catalyst component (A) in this invention. Suitable polycarboxylic acid esters are those having skeletons of the following formula

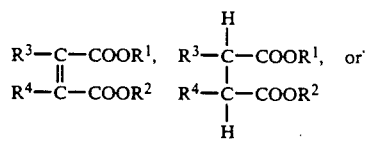

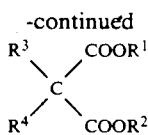

In these formulae, $R^1$ represents a substituted or unsubstituted hydrocarbon group; $R^2$ represents hydrogen or a substituted or unsubstituted hydrocarbon group; $R^3$ and $R^4$ represent hydrogen or a substituted or unsubstituted hydrocarbon group, preferably at least one of them is a substituted or unsubstituted hydrocarbon group; and $R^3$ and $R^4$ may be linked to each other. The substituents may be those containing a hetero atom such as N, O or S, for example the C—O—C, COOR, COOH, OH, $SO_3H$, —C—N—C and $NH_2$ groups.

Especially preferred are dicarboxylic acid diesters in which at least one of $R^1$ and $R^2$ is an alkyl group having at least 2 carbon atoms.

Specific examples of preferred polycarboxylic acid esters include aliphatic polycarboxylic acid esters such as diethyl succinate, dibutyl succinate, diethyl methylsuccinate, diisobutyl alpha-methylglutarate, dibutylmethyl malonate, diethyl malonate, diethyl ethylmalonate, diethyl isopropylmalonate, diethyl butylmalonate, diethyl phenylmalonate, diethyl diethylmalonate, diethyl allylmalonate, diethyl diisobutylmalonate, diethyl di-n-butylmalonate, dimethyl maleate, monoctyl maleate, diisooctyl maleate, diisobutyl maleate, diisobutyl butylmaleate, diethyl butylmaleate, diisopropyl beta-methylglutarate, diallyl ethylsuccinate, di-2-ethylhexyl fumarate, diethyl itaconate, diisobutyl itaconate, diisooctyl citraconate and dimethyl citraconate; aliphatic polycarboxylic acid esters such as diethyl 1,2-cyclohexanecarboxylate, diisobutyl 1,2-cyclohexanecarboxylate, diethyl tetrahydrophthalate and diethyl ester of Nadic acid; aromatic polycarboxylic acid esters such as monoethyl phthalate, dimethyl phthalate, methylethyl phthalate, monoisobutyl phthalate, diethyl phthalate, ethylisobutyl phthalate, mono-n-butyl phthalate, ethyl-n-butyl phthalate, di-n-propyl phthalate, di-isopropyl phthalate, di-n-butyl phthalate, di-isobutyl phthalate, di-n-heptyl phthalate, di-2-ethylhexyl phthalate, didecyl phthalate, benzylbutyl phthalate, diphenyl phthalate, diethyl naphthalenedicarboxylate, dibutyl naphthalenedicarboxylate, triethyl trimellitate and dibutyl trimellitate; and esters of heterocyclic polycarboxylic acids such as 3,4-furanedicarboxylic acid.

Other examples of the polycarboxylic acid ester that can be supported on the titanium catalyst component include long-chain dicarboxylic acid esters such as ethyl adipate, diisobutyl adipate, diisopropyl sebacate, di-n-butyl sebacate, n-octyl sebacate and di-2-ethylhexyl sebacate.

Preferred polycarboxylic acid esters are those having skeletons of the above-given general formulae. More preferred are esters formed between phthalic acid, maleic acid or a substituted malonic acid and alcohols having at least 2 carbon atoms. Diesters formed between phthalic acid and alcohols having at least 2 carbon atoms are especially preferred.

In supporting the above electron donor, the electron donor need not always to be used as a starting material. It is possible to use a compound capable of being changed into an electron donor in the course of preparing the titanium catalyst component, and convert it into the electron donor during the preparation.

Another electron donor may be present in the titanium catalyst component. If it is present in too large an amount, adverse effects are exerted. Hence, its amount should be limited to a small value.

The magnesium compound used in the preparation of the solid titanium catalyst component (A) in this invention is a magnesium compound with or without reducing ability. Examples of the former are magnesium compounds having a magnesium-carbon bond or a magnesium-hydrogen bond, such as dimethylmagnesium, diethylmagnesium, dipropylmagnesium, dibutylmagnesium, diamylmagnesium, dihexylmagnesium, didecylmagnesium, ethyl magnesium chloride, propyl magnesium chloride, butyl magnesium chloride, hexyl magnesium chloride, amyl magnesium chloride, butylethoxymagnesium, ethylbutylmagnesium and butylmagnesium hydride. These magnesium compounds may be used in the form of complexes with organoaluminum, for example, and may be in the liquid or solid state. Examples of the magnesium compound without reducing ability are magnesium halides such as magnesium chloride, magnesium bromide, magnesium iodide and magnesium fluoride; alkoxy magnesium halides such as ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxymagnesiums such as ethoxymagnesium, isopropoxymagnesium, butoxymagnesium, n-octoxymagnesium and 2-ethylhexoxymagnesium; aryloxymagnesiums such as phenoxymagnesium and dimethylphenoxymagnesium; and carboxylic acid salts of magnesium such as magnesium laurate and magnesium stearate. The magnesium compound having no reducing ability may be derived from the magnesium compound having reducing ability or may be derived during preparation of the catalyst component. For example, by contacting the magnesium compound having reducing ability with a polysiloxane compound, a halogen-containing silane compound, a halogen-containing aluminum compound, an ester, and an alcohol, it can be converted into a magnesium compound having no reducing ability. The above magnesium compound may be a complex or binary compound with another metal, or a mixture with another metal compound. Of these, magnesium compounds having no reducing ability are preferred. Halogen-containing magnesium compounds, above all magnesium chloride, alkoxy magnesium chlorides and aryloxy magnesium chlorides, are preferred.

In the present invention, tetravalent titanium compounds of the following formula

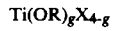

$$Ti(OR)_gX_{4-g}$$

wherein R represents a hydrocarbon group, X represents halogen, and g is a number of 0 to 4, are preferred as examples of the titanium compound used in preparing the solid titanium catalyst component (A). Examples of such compounds include titanium tetrahalides such as $TiCl_4$, $TiBr_4$ and $TiI_4$; alkoxy titanium trihalides such as $Ti(OCH_3)Cl_3$, $Ti(OC_2H_5)Cl_3$, $Ti(O\ n\text{-}C_4H_9)Cl_3$, $Ti(OC_2H_5)Br_3$ and $Ti(O\ iso\text{-}C_4H_9)Br_3$; alkoxy titanium dihalides such as $Ti(OCH_3)_2Cl_2$, $Ti(OC_2H_5)_2Cl_2$, $Ti(O\ n\text{-}C_4H_9)_2Cl_2$ and $Ti(OC_2H_5)_2Br_2$; trialkoxy titanium monohalides such as $Ti(OCH_3)_3Cl$, $Ti(OC_2H_5)_3Cl$, $Ti(O\ n\text{-}C_4H_9)_3Cl$ and $Ti(OC_2H_5)_3Br$; and tetraalkoxy titanium $Ti(OCH_3)_4$, Ti(OC$_2$H$_5$)$_4$ and Ti(O n-C$_4$H$_9$)$_4$. Of these, the halogen-containing titanium compounds, especially titanium tetrahalides, are preferred. Titanium tetrachloride is especially preferred. These titanium compounds may be used singly or as a mixture, or as diluted with a hydrocarbon or a halogenated hydrocarbon.

The amounts of the titanium compound, the magnesium compound and the electron donor to be deposited, and the electron donor which may be used as required (such as an alcohol, phenol, and monocarboxylic acid esters, the silicon compound, the aluminum compound, etc.) in the preparation of the titanium catalyst component (A) differ depending upon the method of preparation, and cannot be generalized. For example, about 0.01 to 5 moles of the electron donor to be deposited and about 0.01 to 500 moles of the titanium compound may be used per mole of the magnesium compound.

In the present invention, an olefin is polymerized or copolymerized using a catalyst composed of the titanium catalyst component (A), an organoaluminum compound catalyst component (B) and an organic silicon compound (C).

Examples of (B) may include:
(i) organoaluminum compounds containing at least one Al-C bond in the molecule, for example organoaluminum compounds of the following formula $$R_l^7Al(OR^8)_iH_pX_q$$

wherein $R^7$ and $R^8$ represent a hydrocarbon group usually having 1 to 15 carbon atoms and may be identical or different, X represents halogen, $0 \leq l \leq 3$, $0 \leq i \leq 3$, $0 \leq p \leq 3$, and $0 \leq q \leq 3$, and $l+i+p+q=3$;

(ii) complex alkylated products formed from metals of Group I and aluminum, which are represented by the following formula $$M^1AlR^7_4$$

wherein $M^1$ represents Li, Na and K, and $R^7$ is as defined above; and (iii) organoaluminum compounds in which two or more aluminums are bonded via an oxygen or nitrogen atom.

Examples of the organoaluminum compound belonging to (i) include:
compounds represented by the following formula $$R_l^7Al(OR^8)_{3-l}$$

wherein $R^7$ and $R^8$ are as defined above and l is preferably $1.5 \leq l \leq 3$;
compounds of the following formula $$R_l^7AlX_{3-l}$$

wherein $R^7$ is as defined, X represents halogen, and l is preferably $0 < l < 3$;
compounds of the following formula $$R_l^7AlH_{3-l}$$

wherein $R^7$ is as defined, and l is preferably $2 \leq l \leq 3$; and compounds of the following formula $$R_l^7Al(OR^8)_iX_q$$

wherein $R^7$ and $R^8$ are as defined above, X is halogen, $0 < l \leq 3$, $0 \leq i < 3$, and $0 \leq q < 3$, and $l+i+q=3$;

Specific examples of the aluminum compounds (i) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition of the formula $R_{2.5}^7$Al(OR$^8$)$_{0.5}$; dialkyl aluminum halides such as diethyl aluminum chloride, dibutyl aluminum chloride and diethyl aluminum bromide; alkyl aluminum sesquihalides such as ethyl aluminum sesqauichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; partially hydrogenated alkyl aluminums, for example alkyl aluminum dihydride such as ethyl aluminum dihydride and propyl aluminum dihydride; and partially alkoxylated and halogenated alkyl aluminums such as ethyl aluminum ethoxy chloride, butyl aluminum butoxy chloride and ethyl aluminum ethoxy bromide.

Examples of the compounds (ii) are LiAl(C$_2$H$_5$)$_4$ and LiAl(C$_7$H$_{15}$)$_4$.

Examples of the compounds (iii) are (C$_2$H$_5$)$_2$AlOAl(C$_2$H$_5$)$_2$, (C$_4$H$_9$)$_2$AlOAl(C$_4$H$_9$)$_2$, $$\underset{\underset{C_2H_5}{|}}{(C_2H_5)_2AlNAl(C_2H_5)_2}$$

and methyl aluminoxane.

Among these, trialkyl aluminums and alkyl aluminums (iii) in which two or more aluminum are bonded are preferred.

The organic silicon compound (C) used in the invention is an organic silicon compound represented by the following formula (I)

$$SiR^{11}_m(OR^{12})_{4-m} \qquad (I)$$

wherein $R^{11}$ represents an alkyl or alkenyl group, $R^{12}$ represents a hydrocarbon group and m is $1 \leq m \leq 2$.

In formula (I), $R^{11}$ may be, for example, an alkyl group having 1 to 10 carbon atoms such as a methyl, ethyl, propyl, butyl, pentyl, hexyl, octyl or decyl group, and an alkenyl group having 2 to 6 carbon atoms such as a vinyl, allyl or propenyl group. $R^{12}$ may be, for example, an alkyl, cycloalkyl, aryl or aralkyl group. Methyl and ethyl groups are particularly preferred. Organic silicon compounds of formula (I) in which m is 1 are especially preferred. Examples of the organic silicon compounds include trialkoxysilanes such as methyltriethoxysilane, ethyltriethoxysilane, vinyltriethoxysilane, n-propyltriethoxysilane, n-butyltriethoxysilane, n-hexyltriethoxysilane, n-octyltripropoxysilane, n-decyltrimethoxysilane and n-decyltriethoxysilane; and dialkoxysilanes such as dimethyldimethoxysilane, diethyldimethoxysilane, di-n-propyldimethoxysilane, di-n- butyldiethoxysilane, di-n-hexyldiethoxysilane, di-n-octylpropoxysilane, di-n-decyldibutoxysilane, methylcyclohexyldimethoxysilane and ethylcyclohexyldiethoxysilane.

According to the process of this invention, the propylene copolymer is produced by polymerizing or copolymerizing propylene in a first polymerization stage consisting of at least two steps in the presence of the above-described catalyst to produce a crystalline propylene polymer, and subsequently random-copolymerizing propylene with another alpha-olefin in a mole ratio of from 10/90 to 90/10 in a second polymerization stage in the presence of the crystalline propylene polymer. The first polymerization stage is carried out in polymerization vessels in at least two steps, preferably at least three steps. The second polymerization stage may be carried out in a single polymerization vessel or in two or more polymerization vessels. In the process of this invention, each step in the first and second polymerization stages may be carried out by vapor-phase polymerization or liquid-phase polymerization. In the case of the liquid polymerization, an inert hydrocarbon may be used as a liquid phase. The starting olefin may be used as a liquid medium.

Advantageously, the amount of the catalyst component (A) used is, for example, about 0.005 to about 0.5 millimole, calculated as Ti atom, per liter of the polymerization volume.

The amount of the organoaluminum compound (B) is advantageously such that the proportion of the metal atom in the component (B) is about 1 to about 2000 moles, preferably about 5 to about 500 moles, per mole of the titanium atoms in the component (A) in the polymerization system.

The amount of the organic silicon compound (C) is advantageously about 0.001 to about 10 moles, preferably about 0.01 to about 2 moles, especially preferably about 0.05 to about 1 mole, calculated as Si atoms in component (C) per mole of the metal atoms in the component (B).

The catalyst components (A), (B) and (C) may be contacted with one another during or before the polymerization. In the contacting before polymerization, any two of them alone may be contacted, or it is possible to contact portions of two or three of them with one another. The contacting of the components before polymerization may be effected in an atmosphere of an inert gas or in an atmosphere of an olefin.

The catalyst used in the pre-polymerization of the olefin before the first stage polymerization of propylene may be used as the polymerization catalyst.

When this catalyst used in the pre-polymerization of the olefin is used as the polymerization catalyst in the block copolymerization of propylene, it may be directly fed to the polymerization system, or after it is washed with an inert hydrocarbon. The proportions of the individual catalyst components are within the aforesaid ranges even when the catalyst used in the pre-polymerization is used as the polymerization catalyst. When the individual components are used only partly in the pre-polymerization treatment, the remainder of the catalyst components are fed in the first polymerization stage in the block copolymerization of propylene.

When propylene is polymerized or copolymerized using the catalyst used in the pre-polymerization of the olefin, the polymerization activity and the stereospecificity of the catalyst are further improved. Particularly, the resulting powdery polymer is spherical and has excellent uniformity and a high bulk density. In addition, in the case of slurry polymerization, the properties of the slurry are excellent. Hence, the handlability of the powder or slurry is excellent.

In the pre-polymerization, about 0.1 to about 500 g, preferably 0.3 to about 300 g, per gram of the component (A), of an olefin is preliminary polymerized in the presence of at least part of the organoaluminum compound (B). At this time, part or the whole of the organic silicon compound (C) may be present in the prepolymerization system. The amount of the organoaluminum compound (B) may be one which is sufficient to polymerize the olefin in the above amount per gram of the component (A). Preferably, it is, for example, about 0.1 to about 100 moles, especially about 0.5 to about 50 moles, per titanium atom in the highly active titanium catalyst component (A).

Preferably, the pre-polymerization is carried out in an inert hydrocarbon medium or a liquid monomer used in the pre-polymerization, under mild conditions. The inert hydrocarbon medium used for this purpose may be selected, for example, from the above-given examples of the inert media which can be used in halogenating organic magnesium compounds or their organic media. The prepolymerization treatment may be carried out batchwise or continuously. It may be carried out in a much higher catalyst concentration than the concentration of the catalyst in the main polymerization system, and this is rather preferred. It is more efficient therefore to carry it out batchwise.

The concentration of the highly active titanium catalyst component (A) in the pre-polymerization treatment is about 0.01 to about 200 millimoles, preferably about 0.05 to about 100 millimoles, calculated as titanium atom, per liter of the inert hydrocarbon medium. The temperature used in the pre-polymerization treatment is one at which the resulting pre-polymer is substantially insoluble in the medium, and is usually about $-20$ to about $+100°$ C., preferably about $-20$ to about $+80°$ C., especially preferably from 0 to about $+40°$ C. The above treatment can be carried out by feeding a predetermined amount of the olefin into a suspension of the catalyst in an inert solvent. The olefin used for this purpose may be, for example, ethylene, propylene, 1-butene, 4-methyl-1-pentene or 1-octene. Those which produce highly crystalline polymers are preferred. Propylene, 4-methyl-1pentene and 1-butene are especially preferred. In the pre-polymerization, a molecular weight controlling agent such as hydrogen may be caused to be present. The amount of the molecular weight controlling agent is preferably limited to one in which a prepolymer having an intrinsic viscosity $[\eta]$, measured in decalin at 135° C., of at least 0.2 dl/g, preferably about 0.5 to about 10 dl/g, can be produced.

The amount of the olefin pre-polymerized is about 0.1 to about 500 g, preferably about 0.3 to about 300 g, per gram of the titanium catalyst component (A). Since an increase in its amount does not correspondingly bring about an increase in effect, it is preferably limited to the above range.

The catalyst subjected to the pre-polymerization treatment is used together with the organoaluminum compound (B) and the organic silicon compound (C) (if the latter are not used in the pre-polymerization treatment), and block copolymerization of propylene is carried out.

In the process of this invention, the first polymerization stage consists of at least two steps, preferably three steps. By polymerizing or copolymerizing propylene in this polymerization stage, a crystalline propylene polymer is formed. In the first step of the first polymerization stage, the polymerization is carried out so that a crystalline polymer having an intrinsic viscosity $[\eta]_{FC}$, measured in decalin at 135° C., of less than 1.8 dl/g is formed If the crystalline propylene polymer formed in the first step has an intrinsic viscosity $[\eta]_{FC}$ of more than 1.8 dl/g, the final block copolymer having an MFR of at least 10 undesirably has very weak dynamical strength. The $[\eta]_{FC}$ of the crystalline propylene polymer formed in the first step is preferably 1.5 to 0.4 dl/g, especially preferably 1.0 to 0.45 dl/g.

The polymerization in the first stage is carried out such that from its final step, a crystalline propylene polymer having an intrinsic viscosity $[\eta]_{XC}$, measured in decalin at 135° C., of 0.7 to 2.0 dl/g is taken out.

If the intrinsic viscosity $[\eta]_{XC}$ of the crystalline propylene polymer obtained from the final step is larger than 2.0 dl/g, the block copolymer having an MFR of at least 10 has inferior dynamical strength. If it is less than 0.7 dl/g, it is difficult to obtain block copolymer in an intimately mixed state.

Preferably, the $[\eta]_{XC}$ of the crystalline propylene polymer obtained from the final step is 1.0 to 1.5 dl/g.

The polymerization in the final step is carried out such that the $[\eta]_{XC}$ of the crystalline propylene polymer obtained in the final step satisfies the above-specified range and the $[\eta]_{FC}/[\eta]_{XC}$ ratio is not more than 0.9. If the $[\eta]_{FC}/[\eta]_{XC}$ ratio is larger than 0.9, it is disadvantageous to the production of a block copolymer in an intimately mixed state.

The $[\eta]_{FC}/[\eta]_{XC}$ ratio is preferably not more than 0.8, especially preferably 0.78 to 0.5.

The proportion of the crystalline propylene polymer formed in the first step of the first stage is usually 10 to 95% by weight, preferably 10 to 90% by weight, most preferably 15 to 90% by weight, based on the crystalline propylene polymer obtained from the last step of the first polymerization stage, and usually 2 to 90% by weight, preferably 5 to 85% by weight, based on the propylene copolymer as a final product. The proportion of the crystalline propylene polymer formed in the first stage polymerization step is usually 50 to 95% by weight, preferably 60 to 90% by weight, based on the propylene copolymer finally produced. The crystalline propylene polymer obtained from the final step of the first polymerization stage has a stereospecificity index, measured by $^{13}$C-NMR, of at least 85%, especially at least 90%.

In the first polymerization stage, propylene is usually homopolymerized. Insofar as the aforesaid crystalline propylene polymer is formed, a small amount (for example, not more than 10 mole%) of an alpha-olefin such as ethylene, 1-butene, 4-methyl-1-pentene, 1-hexene and 1-octene may be copolymerized with propylene.

The temperature at which propylene is polymerized or copolymerized in the first polymerization stage may be properly changed so long as a highly stereospecific highly crystalline polymer can be obtained. Preferably, it is about 20 to about 200° C., especially about 50 to about 90° C. The polymerization pressure is, for example, from atmospheric pressure to about 100 kg/cm², especially about 2 to about 50 kg/cm². The polymerization conditions in each of the steps of the first polymerization stage are properly selected within the aforesaid ranges.

In the second polymerization stage of the present invention, propylene and another alpha-olefin are random-copolymerized in a mole ratio of from 10/90 to 90/10, preferably 20/80 to 80/20, in the presence of the crystalline propylene polymer formed in the previous step and containing the catalyst still having polymerization activity. The random copolymerization in the second polymerization stage may be carried out in the liquid phase or in the vapor phase. Since, however, a copolymer may form which dissolves in the liquid medium, it is preferred in view of the yield of the final product to carry out the block copolymerization in the vapor phase. The temperature and pressure used in the random copolymerization in the second polymerization stage may be properly selected from the same ranges as shown for the production of the crystalline propylene polymer in the first polymerization stage. The other alpha-olefin used as a comonomer in this stage may be for example ethylene, 1-butene, 4-methyl-1-pentene, 1-hexene, 1-octene or 1-decene. It is preferably ethylene or a combination of ethylene with an alpha-olefin having at least 4 carbon atoms.

In the production of the block copolymer in accordance with this invention, a step of producing a crystalline polymer or copolymer of another alpha-olefin may be provided so as to be carried out subsequently to the above step of random copolymerization. In particular, the provision of a step of producing a crystalline polymer or copolymer of ethylene is effective for improving the impact strength of the resulting copolymer.

The polymerization is preferably carried out such that the proportion of the random copolymer or a mixture of it with another crystalline alpha-olefin polymer is about 5% by weight to about 50% by weight, preferably about 1 to about 40% by weight of the copolymer composition of this invention. When a step of producing a crystalline alpha-olefin polymer is further provided, the polymerization is preferably carried out such that the proportion of the crystalline alpha-olefin polymer becomes 0 to about 50% by weight, preferably about 0 to about 35% by weight, based on the resulting copolymer.

According to this invention, a propylene copolymer having excellent melt flowability, moldability, rigidity, impact strength and powder flowability can be produced with a high catalytic efficiency and good operability.

EXAMPLES

The following examples further illustrate the present invention.

EXAMPLE 1

[Preparation of a solid Ti catalyst component (A)]

Anhydrous magnesium chloride (7.14 g; 75 mmoles), 37.5 ml of decane and 35.1 ml (225 mmoles) of 2-ethylhexyl alcohol were reacted at 130° C. for 2 hours to form a uniform solution. Phthalic anhydride (1.67 g; 11.3 mmoles) was added to the solution, and the mixture was stirred at 130° C. for 1 hour to dissolve phthalic anhydride in the uniform solution. The uniform solution so obtained was cooled to room temperature and then wholly added dropwise over 1 hour to 200 ml (1.8 moles) of titanium tetrachloride kept at −20° C. After the addition, the mixed solution was heated to 110° C. over 4 hours; and when the temperature reached 110° C., 5.03 ml (18.3 mmoles) of diisobutyl phthalate was added. The mixture was maintained at this temperature for 2 hours with stirring. After the 2-hour reaction, the solid portion was collected by hot filtration. The solid portion was suspended in 275 ml of TiCl$_4$, and again reacted at 110° C. for 2 hours. After the reaction, the solid portion was collected by hot filtration and washed fully with decane and hexane at 110° C. until no free titanium compound was detected from the washings. The solid Ti catalyst component (A) prepared by the above method was stored as a hexane slurry. Part of it, however, was taken before storage, and dried in order to examine its composition. The solid Ti catalyst component (A) was found to contain 2.6% by weight of titanium, 58% by weight of chlorine, 18% by weight of magnesium and 12.4% by weight of diisobutyl phthalate.

[Pre-polymerization]

A 400 ml nitrogen-purged glass reactor was charged with 200 ml of purified hexane, and 6 mmoles of triethylaluminum and 2 mmoles, calculated as titanium atom, of the Ti catalyst component (A) were introduced. Then, propylene was fed into the reactor at a rate of 5.9 liters/hour for one hour, and 2.8 g, per gram of the Ti catalyst component (A), of propylene was polymerized. The product was filtered to remove the liquid portion, and the separated solid portion was reslurried in decane.

[Polymerization]

(1) A 50-liter autoclave was fully purged with propylene. Propylene (13.5 kg) and 90 Nl of hydrogen were introduced into the autoclave. The autoclave was charged with 7.2 mmoles of triethylaluminum, 0.9 millimole of n-propylenetriethoxysilane and 0.09 mg-atom, calculated as Ti atom, of the Ti catalyst component at 65° C., and propylene was polymerized at 70° C. for 20 minutes.

(2) By releasing the pressure, propylene was removed, and the polymerization was carried out for 1 hour at 80° C. while feeding propylene so as to maintain the pressure of the inside of the autoclave at 15 kg/cm$^2$G.

(3) One hour later, the pressure was released, and a gaseous mixture of ethylene and propylene (ethylene/ propylene mole ratio 65/35) was fed at a rate of 375 Nl/hr at 60° C. for 7 hours to form a block copolymer. No lumpy product was seen to form in the autoclave, nor was there any adhesion to the wall of the autoclave. A polymer having good flowability and a high bulk density was obtained. The amount of the block copolymer yielded was 7.1 . The block copolymer had a melt flow index (measured under a load of 2.13 k9 at 230° C.) of 17.5 kg/10 minutes, an $[\eta]$ of 2.28 dl/g and an ethylene content of 14.9 mole% and contained 9.0% by weight of a component soluble in n-decane at room temperature.

An antioxidant was added to the block copolymer, and the mixture was granulated. Test pieces were prepared from the granules. The block copolymer had a falling dart impact strength (−20° C.) of 200 kg-cm, an Izod impact strength (0° C.) of 13.5 kg-cm/cm and a flexural modulus of 14800 kg/cm$^2$.

The polypropylene obtained in (1) above (the first step of the first polymerization stage) had an intrinsic viscosity $[\eta]_{FC}$ of 1.0 dl/g and a boiling n-heptane extraction residue of 97%.

From the polymerization step (2) (the final step of the first polymerization stage), polypropylene having an intrinsic viscosity $[\eta]_{XC}$ of 1.3 dl/g was obtained.

The $[\eta]_{FC}/[\eta]_{XC}$ ratio was therefore 0.77. The amount of polymerization in the above first-stage polymerization steps (1) and (2) was 50% based on that in the propylene polymerization step.

COMPARATIVE EXAMPLE 1

(1) In polymerization (1) in Example 1, the amount of hydrogen was changed from 90 Nl to 60 Nl, and the polymerization was carried out at 70° C. for 30 minutes.

(2) Then, propylene was removed by releasing the pressure, and 40 Nl of hydrogen was added at 80° C. While adding propylene so as to maintain the remaining pressure at 15 kg/cm$^2$G, the polymerization was carried out for 40 minutes.

(3) After releasing the pressure, a gaseous mixture of ethylene and propylene (ethyene/propylene mole ratio 65/35) was fed at a rate of 375 Nl/hr for 100 minutes at 60° C. to form a block copolymer. The amount of the copolymer yielded was 6.8 kg, and it had an apparent density of 0.45 g/ml, a melt flow index of 22 g/10 minutes, an $[\eta]$ of 2.14 dl/g and ethylene content of 14.1 mole%. It contained 8.8% by weight of a component soluble in decane at room temperature. An antioxidant was added to the block copolymer, and the mixture was granulated. Test pieces were prepared from the granules. The block copolymer was found to have a falling dart impact strength (−20° C.) of 170 kg-cm, an Izod impact strength (0° C.) of 14.8 kg-cm/cm and a flexural modulus of 14500 kg/cm$^2$.

The ratio of the $[\eta]_{FC}$ of the polypropylene formed in the polymerization step (1) to the $[\eta]_{XC}$ of the polypropylene formed in the polymerization step (2), $[\eta]_{FC}/[\eta]_{XC}$, was 1.0.

EXAMPLE 2

[Preparation of a solid catalyst component (A)]

A 2-liter high-speed agitating device (made by Tokushu Kika Kogyo) was fully purged with nitrogen, and charged with 700 ml of purified kerosene, 10 g of commercial MgCl$_2$, 24.2 g of ethanol and 3 g of Emasol 320 (a tradename for sorbitan distearate produced by Kao-Atlas Co., Ltd.). The materials were heated with stirring, and stirred at 120° C. and 800 rpm for 30 minutes. With stirring at high speed, the mixture was transferred to a 2-liter glass flask (equipped with a stirrer) filled with 1 liter of purified kerosene cooled at −10° C. by using a Teflon tube having an inside diameter of 5 mm. The resulting solid was collected by filtration, and fully washed with hexane to obtain a carrier.

The carrier (7.5 g) was suspended at room temperature in 150 ml of titanium tetrachloride, and 1.3 ml of diisobutyl phthalate was added. The mixture was heated to 120° C. The mixture was stirred at 120° C. for 2 hours, and the solid portion was collected by filtration and suspended in 150 ml of titanium tetrachloride, and the suspension was stirred at 130° C. for 2 hours. The solid was collected from the reaction mixture by filtration and washed with a sufficient amount of purified hexane to give a solid titanium component (A). This catalyst component was found to contain 2.3% by weight of titanium, 63% by weight of chlorine, 20% by weight of magnesium and 8.1% by weight of diisobutyl phthalate.

[Pre-polymerization]

Purified hexane (200 ml) was introduced into a 400 ml glass reactor purged with nitrogen. Then, the reactor was charged with 6 mmoles of triethylaluminum and 2 mmoles, as titanium atom, of the Ti catalyst component (A), and propylene was fed into the reactor at a rate of 5.9 liters/hour for 1 hour to polymerize 2.8 g, per gram of the Ti catalyst component (A), of propylene. After the pre-polymerization, the liquid portion was removed by filtration, and the separated solid portion was reslurried in decalin.

[Polymerization]

(1) A 50-liter autoclave was fully purged with propylene. Propylene (13.5 kg) and 250 Nl of hydrogen were added to the autoclave, and 7.2 mmoles of triethylaluminum, 0.72 mmole of n-decyltriethoxysilane and 0.09 mg-atom, calculated as Ti atom, of the Ti catalyst component were also added at 65° C. Propylene was polymerized at 70° C. for 20 minutes.

(2) By releasing the pressure, propylene was removed, and the polymerization was carried out for 1.5 hours at 75° C. while feeding propylene so as to maintain the pressure of the inside of the autoclave at 15 kg/cm$^2$G.

(3) One hour later, the pressure was released, and a gaseous mixture of ethylene and propylene (ethylene/ propylene mole ratio 50/50) was fed at a rate of 425 Nl/hr at 65° C. for 2 hours to give a block copolymer. No adhesion to the wall of the autoclave occurred, nor was there any formation of a lumpy product in the autoclave. The resulting powder had a high apparent density and good flowability. The amount yielded of the block copolymer was 6.9 kg. The powder had an apparent density of 0.41 g/ml, a melt flow index of 11.0 g/10 minutes, an $[\eta]$ of 2.10 dl/g and an ethylene content of 24 mole%. It contained 25% by weight of a component soluble in decane at room temperature.

An antioxidant was added to the block copolymer, and the mixture was granulated. Test pieces were prepared from the granules. The copolymer was found to have a falling impact strength ($-30°$ C.) of 270 kg/cm, an Izod impact strength ($-30°$ C.) of 12.5 kg-cm/cm and a flexural modulus of 9500 kg/cm$^2$.

The polypropylene formed in the polymerization step (1) had an $[\eta]_{FC}$ of 0.82 dl/g and a boiling n-heptane extraction residue of 97%. The polypropylene obtained in the polymerization step (2) had an $[\eta]_{XC}$ of 1.31 dl/g.

The $[\eta]_{FC}/[\eta]_{XC}$ ratio was therefore 0.63. The amount of polymerization in (1) and (2) was 40% of that in the propylene polymerization step.

EXAMPLE 3

[Preparation of a solid Ti catalyst component (A)]

Silicon dioxide (#952, a tradename for a product of Davison Company) was calcined in a nitrogen stream at 200° C. for 2 hours and then at 700° C. for 5 hours. Ten grams of the calcined silicon dioxide, 40 ml of purified n-heptane and 40 ml of a 20% n-heptane solution of n-butylethylmagnesium were put in a 500 ml flask, and reacted at 80° C. for 1 hour. Furthermore, 30 ml of purified n-heptane was added, and the reaction was carried out at 90° C. for 2 hours. After the reaction, the supernatant was removed, and the residue was washed five times with 100 ml of purified n-heptane. Finally, 40 ml of purified n-heptane was added to the suspension to adjust its total amount to about 70 ml. The suspension was then cooled to 0° C., and a solution composed of 19.2 g of trichloroethanol and 20 ml of purified n-heptane was added dropwise to the suspension at 0° C. over about 30 minutes. The mixture was maintained further at the above temperature for 1 hour, and then heated to 80° C. over 1 hour. The reaction was carried out at this temperature for 1 hour. The supernatant was removed, and the residue was washed with 100 ml of purified n-heptane twice and then with 100 ml of purified toluene three times. Finally, purified toluene was added to adjust the total amount of the suspension to 200 ml. A 25 ml portion of the suspension (200 ml) was uniformly taken into a 400 ml glass receptacle, and 55 ml of purified toluene was added. Then, 1.0 ml of di-n-butyl phthalate was added, and the mixture was reacted at 50° C. for 2 hours. Then, 52.5 ml of TiCl$_4$ was added, and the reaction was carried out at 90° C. for 2 hours. The liquid portion was removed by filtration, and the solid portion was collected. The solid portion was washed with 100 ml of purified n-heptane four times to give a solid catalyst component (A). The catalyst component (A) contained 3.3% by weight of titanium, 4.2% by weight of magnesium, 17% by weight of chlorine and 5.2% by weight of di-n-butyl phthalate.

[Polymerization]

(1) A 50-liter autoclave was purged fully with propylene, and 13.5 kg of propylene, 26 mmoles of triethylaluminum, 4 mmoles of n-propyltriethoxysilane and 0.62 g of the Ti catalyst component were added to the autoclave at 23° C. After adding 65 Nl of hydrogen, propylene was polymerized at 75° C. for 50 minutes.

(2) Then, propylene was removed by releasing the pressure, and the polymerization was carried out for 1 hour at 80° C. while feeding propylene so as to maintain the pressure of the inside of the autoclave at 15 kg/cm$^2$G.

(3) One hour later, the pressure was released, and a gaseous mixture of ethylene and propylene (ethylene/ propylene mole ratio 60/40) was fed at a rate of 505 Nl/hr at 65° C. for 2 hours to form a block copolymer. The amount yielded of the block copolymer was 5.7 kg. It had a melt flow index of 38.5 g/10 minutes, an $[\eta]$ of 1.71 dl/g and an ethylene content of 13.5 mole%. It contained 15.1% by weight of a component soluble in decane at room temperature.

An antioxidant was added to the block copolymer, and the mixture was granulated. Test pieces were prepared from the granules. The block copolymer was found to have a falling dart impact strength ($-30°$ C.) of more than 210 kg-cm, an Izod impact strength (0° C.) of 4.8 kg-cm/cm and a flexural modulus of 11900 kg/cm$^2$.

The polypropylene formed in the polymerization step (1) had a $[\eta]_{FC}$ of 0.92 dl/g and a boiling n-heptane extraction residue of 96%. The polypropylene formed in the polymerization step (2) had a $[\eta]_{XC}$ of 1.21 dl/g.

The $[\eta]_{FC}/[\eta]_{XC}$ of 0.76. The amount of polymerization in the first-stage polymerization steps (1) and (2) was 65% of that in the propylene polymerization step.

What is claimed:

1. A process for producing a propylene block copolymer having an MFR value of at least 10 g/10 minutes in the presence of a catalyst system formed from (A) a solid titanium catalyst component containing magnesium, titanium, halogen and a polycarboxylic acid ester as essential ingredients formed by contacting a magnesium compound, a titanium compound and the polycarboxylic acid ester,
(B) an organoaluminum compound, and
(C) an organic silicon compound represented by the following formula (I)

$$SiR^{11}{}_m(OR^{12})_{4-m} \tag{I}$$

wherein $R^{11}$ represents an alkyl or alkenyl or alkenyl group, $R^{12}$ represents a hydrocarbon group, and m is $1 \leq m \leq 2$,
which comprises
(I) polymerizing or copolymerizing propylene in a first polymerization stage consisting of at least two steps wherein a crystalline propylene polymer having an intrinsic viscosity $[\mu]_{FC}$, measured in decalin at 135° C., of less than 1.8 dl/g is produced in the first step, the polyermization or copolymerization is carried out further in the subsequent steps, and from the final step, a crystalline propylene polymer from the first stage is obtained having an intrinsic viscosity $[\mu]_{XC}$, measured in decalin at 135° C., of 0.7 to 2.0 dl/g, the $[\mu]_{FC}/[\mu]_{XC}$ ratio being adjusted to not more than 0.9, and
(II) random-copolymerizing propylene and other alpha-olefin in a mole ratio of from 20/80 to 80/20 in a second polymerization stage in the presence of said crystalline polypropylene.

2. The process set forth in claim 1 wherein in the first step of the first polymerization stage, a crystalline propylene polymer having an intrinsic viscosity $[\eta]_{FC}$ of 1.5 to 0.4 dl/g is formed.

3. The process set forth in claim 1 wherein in the first step of the first polymerization stage, a crystalline propylene polymer having an intrinsic viscosity $[\eta]_{FC}$ of 1.0 to 0.45 dl/g is formed.

4. The process set forth in claim 1 wherein a crystalline propylene polymer having an $[\eta]_{XC}$ of 1.0 to 1.5 dl/g is obtained from the final step of the first polymerization stage.

5. The process set forth in claim 1 wherein the ratio of the $[\eta]_{FC}$ of the crystalline propylene polymer formed in the first step of the first polymerization stage to the $[\eta]_{XC}$ of the crystalline propylene polymer obtained in the final step of the first polymerization stage, $[\eta]_{FC}/[\eta]_{XC}$, is not more than 0.8.

6. The process set forth in claim 1 wherein the ratio of the $[\eta]_{FC}$ of the crystalline propylene polymer formed in the first step of the first polymerization stage to the $[\eta]_{XC}$ of the crystalline propylene polymer obtained in the final step of the first polymerization stage, $[\eta]_{FC}/[\eta]_{XC}$, is from 0.78 to 0.5.

7. The process set forth in claim 1 wherein the proportion of the crystalline propylene polymer formed in the first step of the first polymerization stage is 10 to 95% by weight based on the entire crystalline propylene polymer formed in the first polymerization stage.

8. The process set forth in claim 1 wherein the proportion of the crystalline propylene polymer formed in the first step of the first polymerization stage is 2 to 90% based on the propylene copolymer obtained from the second polymerization stage.

9. The process set forth in claim 1 wherein the proportion of the crystalline propylene polymer formed in the first polymerization stage is 50 to 95% by weight based on the propylene copolymer obtained from the second polymerization stage.

* * * * *